(12) United States Patent
    Deshmukh (10) Patent No.: US 10,356,165 B2
(45) Date of Patent: Jul. 16, 2019

(54) DYNAMIC RESOURCE REPOSITIONING LOAD BALANCING AND LOCATION MANAGEMENT SYSTEM AND METHOD

(71) Applicant: Sudarshan Deshmukh, Pune (IN)

(72) Inventor: Sudarshan Deshmukh, Pune (IN)

( * ) Notice: Subject to any disclaimer, the term of this patent is extended or adjusted under 35 U.S.C. 154(b) by 347 days.

(21) Appl. No.: 15/430,493

(22) Filed: Feb. 12, 2017

(65) Prior Publication Data

US 2017/0163558 A1  Jun. 8, 2017

Related U.S. Application Data

(63) Continuation-in-part of application No. 14/499,157, filed on Sep. 27, 2014, now Pat. No. 9,584,423.

(30) Foreign Application Priority Data

Sep. 27, 2013  (IN) .......................... 3081/MUM/2013

(51) Int. Cl.
    *H04L 29/08*     (2006.01)
    *G06F 9/50*      (2006.01)
    *H04L 12/24*     (2006.01)

(52) U.S. Cl.
    CPC ............ *H04L 67/1002* (2013.01); *G06F 9/50* (2013.01); *G06F 9/5072* (2013.01); *H04L 41/0896* (2013.01); *H04L 41/12* (2013.01); *H04L 67/10* (2013.01); *H04L 67/1004* (2013.01); *H04L 67/1008* (2013.01); *H04L 67/1021* (2013.01); *H04L 67/18* (2013.01)

(58) Field of Classification Search
    CPC ............. H04L 67/1002; H04L 41/0896; H04L 67/1008; H04L 41/12; H04L 67/10; H04L 67/18; H04L 67/1021; H04L 67/1004; G06F 9/50; G06F 9/5072
    See application file for complete search history.

(56) References Cited

U.S. PATENT DOCUMENTS

| | | | |
|---|---|---|---|
| 2004/0244006 A1* | 12/2004 | Kaufman | G06F 9/5066 718/105 |
| 2004/0260799 A1* | 12/2004 | Bates | H04L 67/104 709/223 |
| 2008/0216087 A1* | 9/2008 | Dillenberger | G06F 9/505 718/105 |

(Continued)

*Primary Examiner* — Hashim S Bhatti
*Assistant Examiner* — Abdullahi Ahmed
(74) *Attorney, Agent, or Firm* — Ryan Alley IP (57) ABSTRACT

A dynamic resource repositioning load balancing and location management system repositions an incoming resource in a grid network of nodes. The system includes a first mapping device to map topology of said gird network of nodes, along with its resources; a determination device to determine at least an incoming resource's initial placement in terms of relative position of said node that the resource currently occupies and in terms of relative number of edges on which said resource currently resides; and resource repositioning device to reposition said at least a resource, in said grid network of nodes, in response to an incoming resource, said repositioning based on said determined position of said incoming resource; characterized, in that, said repositioning mechanism being guided by at least a step or a combination of steps or repetition of steps selected from a group of steps.

20 Claims, 7 Drawing Sheets

(56) References Cited

U.S. PATENT DOCUMENTS

2010/0113159 A1* 5/2010 Chapman ............ A63F 3/04
  463/42
2014/0082201 A1* 3/2014 Shankari ............ H04L 47/70
  709/226

* cited by examiner

FIG. 1

Existing Model ( Phase 1 )

Grid -1

Grid -2

Grid -3

Grid - 4

| Time Instance | Number of resources available | No. of resources removed | Grid-1 | Grid -2 | Grid -3 | Grid -4 |
|---|---|---|---|---|---|---|
| T1 | 32*4=128 | 0 | 32 | 32 | 32 | 32 |

FIG. 2

Existing Model ( Phase 2 )

Grid -1   (Remove 5)

Grid -2   (Remove 7)

Grid -3   (Remove 10)

Grid – 4  (Remove 8)

| Time Instance | Number of resources available | No. of resources removed | Grid-1 | Grid -2 | Grid -3 | Grid -4 |
|---|---|---|---|---|---|---|
| T2 | 32*4=128 | 30 | 32- 5=27 | 32- 7=27 | 32-10=22 | 32-8=24 |

Proposed Model : ( Stage 1 )

Grid -1

Grid -2

Grid -3

Grid – 4

| Time Instance | Number of resources available | No. of resources removed | Grid-1 | Grid-2 | Grid-3 | Grid-4 |
|---|---|---|---|---|---|---|
| T3 | 32*4=128 | 30 | Shift the core modules to the closest corner of the respective grid. | Shift the core modules to the closest corner of the respective grid. | Shift the core modules to the closest corner of the respective grid. | Shift the core modules to the closest corner of the respective grid. |

FIG. 3

Proposed Model : (Stage 2)

Grid -1

Grid -2

Grid -3

Grid - 4

| Time Instance | Number of resources available | No. of resources removed | Grid-1 | Grid -2 | Grid -3 | Grid -4 |
|---|---|---|---|---|---|---|
| T4 | 32*4=128 | 30 | Replace the closest corner of the respective grid with core module. | Replace the closest corner of the respective grid with core module. | Replace the closest corner of the respective grid with core module. | Replace the closest corner of the respective grid with core module. |

Proposed Model (stage 3)

| Time Instance | Number of resources available | No. of resources removed | Grid-1 | Grid-2 | Grid-3 | Grid-4 |
|---|---|---|---|---|---|---|
| T5 | 32*4=128 | 30 | Merge All the grids in such a way that commonality among resources as a result of replication belongs to the shared modules between respective edges. i.e. node 6 contains resources shared by all four edges. | | | |

DYNAMIC RESOURCE REPOSITIONING LOAD BALANCING AND LOCATION MANAGEMENT SYSTEM AND METHOD

FIELD

This invention relates to the field of network systems and network architecture.

Particularly, this invention relates to the field of load balancing and location management in network systems and network architecture.

Specifically, this invention relates to a dynamic resource repositioning load balancing and location management system and method.

BACKGROUND

A network system is defined as a group of nodes which are interconnected in a pre-determined fashion. The nodes may work in a synchronous manner, in an asynchronous manner, in a collaborative manner, in a distinctive manner, in a sequential manner, in a non-sequential manner, in a discrete manner, in a pattern, out of a pattern, or in any type of manner predetermined by the intended use of the network.

In networking, load refers to the amount of data (traffic) being carried by a network. One of the parameters of an efficient system, especially, of a network system is the amount of load that it handles.

For many loads; whether physical or virtual, load distribution is an important function of network attributes. Load changes may be in the form of load addition, load deletion, or mere load change. This comprises resource additional, resource deletion, resource changes, node addition, node deletion, node changes, data addition, data deletion, data changes, and/or the like.

Network Load Balancing (NLB) is the management of traffic across a network.

In at least a first embodiment, Network Load Balancing distributes workload across multiple CPUs, disk drives and other resources in an effort to use network resources more efficiently and avoid network overload. Load balancing may be accomplished through software or hardware.

Network load balancing is an efficient and cost-effective solution designed to enhance availability and scalability of Internet applications by allowing system administrators to build clusters, which are load balanced with incoming client requests.

In at least a second embodiment, a load balancer is a device that acts as a reverse proxy and distributes network or application traffic across a number of servers. Load balancers are used to increase capacity (concurrent users) and reliability of applications. They improve the overall performance of applications by decreasing the burden on servers associated with managing and maintaining application and network sessions, as well as by performing application-specific tasks.

In at least a third embodiment, Network Load Balancing distributes IP traffic across multiple cluster hosts. It also ensures high availability by detecting host failures and automatically redistributing traffic to the surviving hosts. Network Load Balancing provides remote controllability and supports rolling upgrades.

Typically, Network Load Balancing enables a network to deliver high performance and failover protection Network Load Balancing servers (also called hosts) in a cluster communicate among themselves to provide key benefits, including scalability and high availability (of nodes).

In at least a fourth embodiment, Network Load Balancing uses port rules to customize load balancing. Port rules can select either multiple-host or single-host load-balancing policies. Port rules also comprise handling priority.

According to the prior art, one of the techniques for load distribution is a DHT (Distributed Hash Table) technique. This technique considers logical distance between the nodes. This technique makes a choice of destination node to transfer the extra load on the basis of logical distance analysis, and not on physical distance measure.

According to the prior art, one of the techniques for load distribution is a Static Load Balancing technique. This technique is not suitable for distributed applications.

According to the prior art, one of the techniques for load distribution Dynamic Load Balancing technique. This technique is not suitable when the system in stable enough.

Furthermore, according to the prior art, all prior art technologies are not scalable in a co-ordinated manner.

Figure 1:
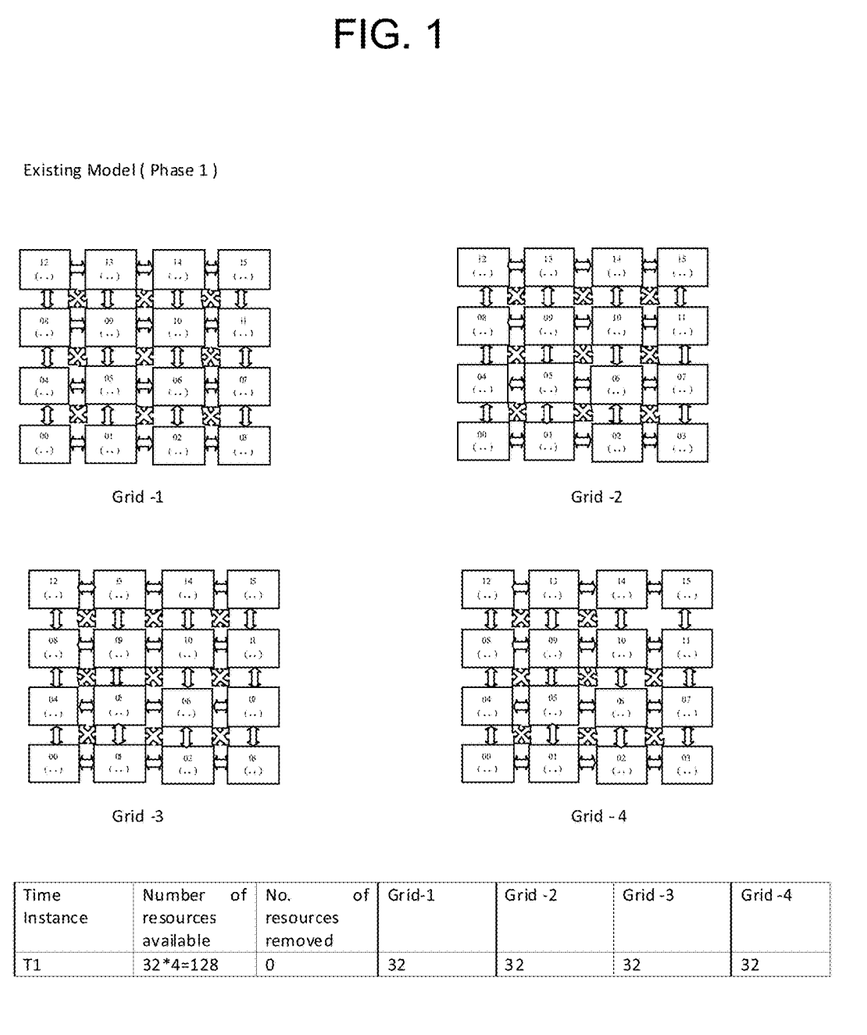
FIG. 1 illustrates one of the existing models of grid layout.

FIG. 1 illustrates one of the existing models of grid layout. Below is an associated Table 1.

TABLE 1

| Time Instance | Number of resources available | No. of resources removed | Grid-1 | Grid-2 | Grid-3 | Grid-4 |
|---|---|---|---|---|---|---|
| T1 | 32 * 4 = 128 | 0 | 32 | 32 | 32 | 32 |

Figure 2:
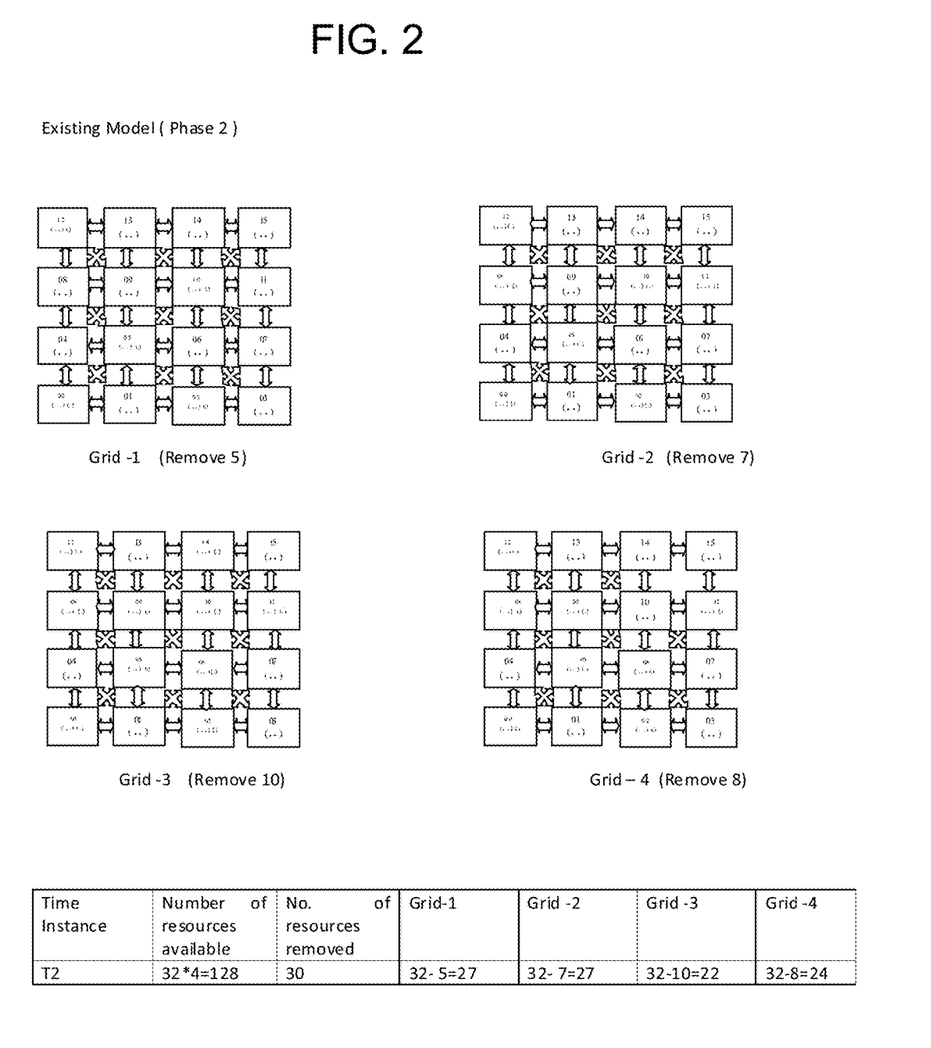
FIG. 2 illustrates one more of the existing models of grid layout, where resources and nodes have been removed.

FIG. 2 illustrates one more of the existing models of grid layout, where resources and nodes have been removed. Below is an associated Table 2.

TABLE 2

| Time Instance | Number of resources available | No. of resources removed | Grid-1 | Grid-2 | Grid-3 | Grid-4 |
|---|---|---|---|---|---|---|
| T2 | 32 * 4 = 128 | 30 | 32 − 5 = 28 | 32 − 7 = 28 | 32 − 10 = 22 | 32 − 8 = 24 |

SUMMARY

An object of the invention is to balance loads.

Another object of the invention is to balance loads, of any type, in a network.

Yet another object of the invention is to balance loads, of any type, in a network, when a load is removed.

Still another object of the invention is to provide a location management scheme for load balancing in order to balance resources over a given cluster to make best utilization of system (network).

Still another object of the invention is to provide a location management scheme for load balancing, upon removal or deletion of resources, in order to balance resources over defined nodes in order to make best utilization of system (network).

An additional object of the invention is to provide an efficient load balancing scheme for grid based networks and systems.

Yet an additional object of the invention is to provide a resource repositioning system and method for arrangement, displacement, and repositioning of resources from one area to another area in a pre-determined fashion such that network (comprising the resources) load index is kept constant up to n number of next removals.

Still an additional object of the invention is to provide a resource repositioning system and method for arrangement, displacement, and repositioning of nodes from one area to another area in a pre-determined fashion such that network (comprising the nodes) load index is kept constant up to n number of next removals.

According to this invention, there is provided a dynamic resource repositioning load balancing and location management system in order to reposition existing resources in a grid network of nodes, in response to an outgoing resource from said grid network of nodes, said system comprises:

at least a first mapping mechanism in order to map topology of said grid network of nodes, along with its resources;

at least a determination mechanism in order to determine at least an outgoing resource's initial placement in terms of relative position of said node that the resource currently occupies and in terms of relative number of edges on which said resource currently resides, said relative position being selected from a corner node or an intermittent node in respect of a designated grid, said relative number position also being selected from an overlap position or a non-overlap position;

resource repositioning mechanism in order to reposition said at least a resource, in said grid network of nodes, in response to an outgoing resource, said repositioning based on said determined position of said outgoing resource; characterised, in that, said repositioning mechanism being guided by at least a step or a combination of steps or repetition of steps selected from a group of steps consisting of the following:

for any outgoing resource from an existing node, in a designated grid, determined as being from a corner node and from a non-overlapping node, moving one resource each from any two intermittent nodes of non-overlapping adjacent edges, belonging to that particular edge from where resource is removed;

for any outgoing resource from an existing node, in a designated edge, determined as being from an intermittent node and from a non-overlapping node, moving one resource from any one intermittent node of non-overlapping adjacent edge to another corner node of the edge from where said intermittent node's resource is removed.

Typically, said at least a determination mechanism comprises at least a first decision making mechanism adapted to decide if said existing resource is removed from an intermittent node.

Typically, said at least a determination mechanism comprises at least a second decision making mechanism adapted to decide if said existing is removed from a corner node.

Typically, said at least a determination mechanism comprises at least a third decision making mechanism adapted to decide if said outgoing resource belongs to one edge in order to term it as a non-overlapping resource.

Typically, said at least a determination mechanism comprises at least a fourth decision making mechanism adapted to decide if said outgoing resource belongs to two edges in order to term it as an overlapping resource.

Typically, said at least a determination mechanism comprises at least a fifth decision making mechanism to determine if number of overlaps is zero.

Typically, said at least a determination mechanism comprises at least a sixth decision making mechanism to determine if number of overlaps is two.

Typically, said at least a determination mechanism comprises at least a seventh decision making mechanism to determine if number of overlaps is four.

Typically, said resource repositioning mechanism comprises at least a first resource replacement task invoking mechanism in order to invoke a first task if output of said at least a second decision making mechanism, said fourth decision making mechanism, and said sixth decision making mechanism is simultaneously true, wherein, output of said second decision making mechanism being determined as a first corner node, characterised, in that, said first task comprises following steps to be performed at least once:

selecting an edge which is adjacent to a second corner node of the edge from where said resource is removed;

selecting an intermittent node from said selected edge;

moving a resource from said selected intermittent node to its adjacent overlapped corner node which belongs to an edge from where said resource is removed;

moving resource from said second corner node of unselected edge, to any intermittent node of adjacent edge to it; and moving resource from any intermittent node of overlapped edge to said first corner node from where said resource is removed.

Typically, said resource repositioning mechanism comprises at least a second resource replacement task invoking mechanism in order to invoke a second task if output of said at least a second decision making mechanism, said fourth decision making mechanism, and said sixth decision making mechanism is simultaneously true, wherein, output of said second decision making mechanism being determined as a first corner node, characterised, in that, said second task comprises following steps to be performed at least once:

selecting two edges adjacent to said first corner node from where said resource is removed;

from each edge, moving one resource from any adjacent intermittent node to a second corner node from where said resource is removed; and moving resource from a second corner node of overlapped edge to any adjacent intermittent node which belongs to adjacent non-overlapped edge to that other node.

Typically, said resource repositioning mechanism comprises at least a third resource replacement task invoking mechanism in order to invoke a third task if output of said at least a second decision making mechanism, said fourth decision making mechanism, and said sixth decision making mechanism is simultaneously true, wherein, output of said second decision making mechanism being determined as a first corner node, characterised, in that, said third task comprises following steps to be performed at least once:

moving resource from an intermittent node of non-overlapped edge to node from where resource is removed; and moving resource from an intermittent node of adjacent edge to a corner node which is a common corner node of current edge and the edge from said first corner node.

Typically, said resource repositioning mechanism comprises at least a fourth resource replacement task invoking mechanism in order to invoke a fourth task if output of said at least a first decision making mechanism, said fourth decision making mechanism, and said sixth decision making mechanism is simultaneously true, wherein, output of said first decision making mechanism being determined as a first intermittent node, characterised, in that, said fourth task comprises following steps to be performed at least once:

selecting any one corner node of edge from where said resource was removed;

moving resource from any one intermittent node from any edge adjacent to said selected corner node; and     moving resource from a second intermittent node of non-selected edge to an adjacent edge's intermittent node.

Typically, said resource repositioning mechanism comprises at least a fifth resource replacement task invoking mechanism in order to invoke a fifth task if output of said at least a first decision making mechanism, said fourth decision making mechanism, and said sixth decision making mechanism is simultaneously true, wherein, output of said first decision making mechanism being determined as a first intermittent node, characterised, in that, said fifth task comprises following steps to be performed at least once:

selecting any one corner node of edge from where said resource was removed;

moving resource from any one intermittent node, each of both edges adjacent to said selected corner node; and     moving resource from each of the other corner nodes of said selected edge to their respective adjacent nodes' intermittent nodes.

Typically, said resource repositioning mechanism comprises at least a sixth resource replacement task invoking mechanism in order to invoke a sixth task if output of said at least a first decision making mechanism, said fourth decision making mechanism, and said seventh decision making mechanism is simultaneously true, wherein, output of said first decision making mechanism being determined as a first intermittent node, characterised, in that, said sixth task comprises following steps to be performed at least once:

adding a resource from any intermittent node to another corner node of edge;

moving a resource from another corner node of non-selected edge to said adjacent intermittent node belonging to adjacent edge; and     moving resource from said intermittent node of overlapped edge of which said added corner node and said another corner node belongs.

BRIEF DESCRIPTION OF THE DRAWINGS

The invention will now be described in relation to the accompanying drawings, in which.

DETAILED DESCRIPTION

One of the problems is that when a job or item or task or node is removed from an edge of a grid, load gets decreased on that edge. Here, load metric, as total number of resources available in a network, at a given time, is considered. Hence, there is a need for a system and method that will make this metric static though removal of existing resources is going on. The system and method should also make restructuring of resources in such a way that each grid contain same number of resources.

According to a non-limiting exemplary embodiment of a network, there may be n-grids in the network/system. All grids have some subset of resources. The number and type of resources inside the grid depends on the demand of those resources inside the grid. This demand is attributed by the requests raised by user set in that area. A particular area has certain attributes which decides what and how many requests are there for the resource(s). Depending on this, the localization, number of replica created for the given resource, movement of resources is decided. These elements will decide the frequency of load balancing initiative and the resource imbalance.

Companies such as Google, Yahoo, Facebook, Microsoft, Amazon, Apple, Twitter, and the like generate, maintain, aggregate, and store large volumes of data. Typically, these companies have separate infrastructure for each region. The regions may be divided according to continents or regions re-defined by the companies such as Indian continent, South-East Asian Continent, Asia Pacific region, North Americas, South Americas, Europe, Russia, Australia, Australasia, UK, China, Middle East, and the like. The size and scope of this infrastructure heavily depends on the amount of requests issued per unit time in or for that region. Again, if as per request rate, infrastructure is deleted, there will not be much guarantee that same request rate will persist down the line. This is a major problem to be solved. The total number of resources, provisioned, is proportionally same to the number of requests issued per unit time. Organizations are facing problems in deploying services to these different scenarios. So, it is of utmost requirement put by these organizations which is, that irrespective of any change i.e. increase or decrease in the request rate, infrastructure should be same up to a pre-determined manageable limit. The other problem, in this context, is that although load is balanced to the particular grid, but at a global scenario, (the entire region-wise grid for the specific organization), each grid with different capacity holdings reflects the total imbalance in terms of global consideration.

Furthermore, one of the problems discussed is a problem relating to the pigeonhole principle. E.g. if there are three nests and four birds, and all birds want to lay eggs, and the condition is that one bird can lay eggs in one nest only and no other bird should use the nest used by another bird, then ultimately, one bird cannot find a nest to lay an egg in. Correspondingly, in a network, the total number of users is more than the available resources in a system, there is a problem, at hand.

According to another non-limiting exemplary embodiment, utilization of many energy resources for power generation is helpful in lower power requirement stages such that if one source is able to satisfy the power need then another one will can be removed to save resources. There are several factors, why decreased power is required. Considering the maximum power limit of one area in a city=n, if elements (consuming power) are removed, then limit of same area=n−1. Hence, power arrangements need to be made for n−1 nodes. This removal of existing power consumer leads to at least two problems: 1) imbalanced network; and 2) difficulty in managing the network infrastructure. The proposed solution to this problem lies in designing a system and method which, regardless of deletion of resources, nodes, or existing power consumer, balances the network framework to the number that was initially set to the network framework. This should provide for a balanced infrastructure, thereby making it easy to manage. Other advantage of the proposed solution is that there is no requirement to delete extra resources where reduced power requirement is there, characterized, in that, the power consumer nodes, of this exemplary embodiment, need to be organized in a rather 'special', 'pre-determined' manner such that it conforms to pre-determined rules of re-alignment.

For the purposes of this specification, the term, 'resource' comprises load, objects, data, and the like.

For the purposes of this specification, the term, 'node' comprises a location or a placeholder where a resource or a plurality of resources may reside.

For the purposes of this specification, the term, 'network' or 'grid' comprises a pool of nodes and resources, thereof. Typically, the grid has a particular pattern or architecture, and the network includes a system allowing interaction between two or more electronic devices, and includes any form of inter/intra enterprise environment such as the world wide web, Local Area Network (LAN), Wide Area Network (WAN), Storage Area Network (SAN) or any form of Intranet.

As used herein, the term "intermittent" includes "intermediary" and "interstitial."

As used herein, the term "means" and "mechanism" includes a computer-processor driven device with the named functionality, including a determinator, repositioner, mapper, processor, locator, positioner, decider, etc. Such devices may further include permanent and transient data storage as well as specific programming for the computer processor to execute their functions described below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude or rule out the presence or addition of one or more other features, integers, steps, operations, elements, components, and/or groups thereof.

According to this invention, there is provided a dynamic resource repositioning load balancing and location management system and method.

Figure 7:
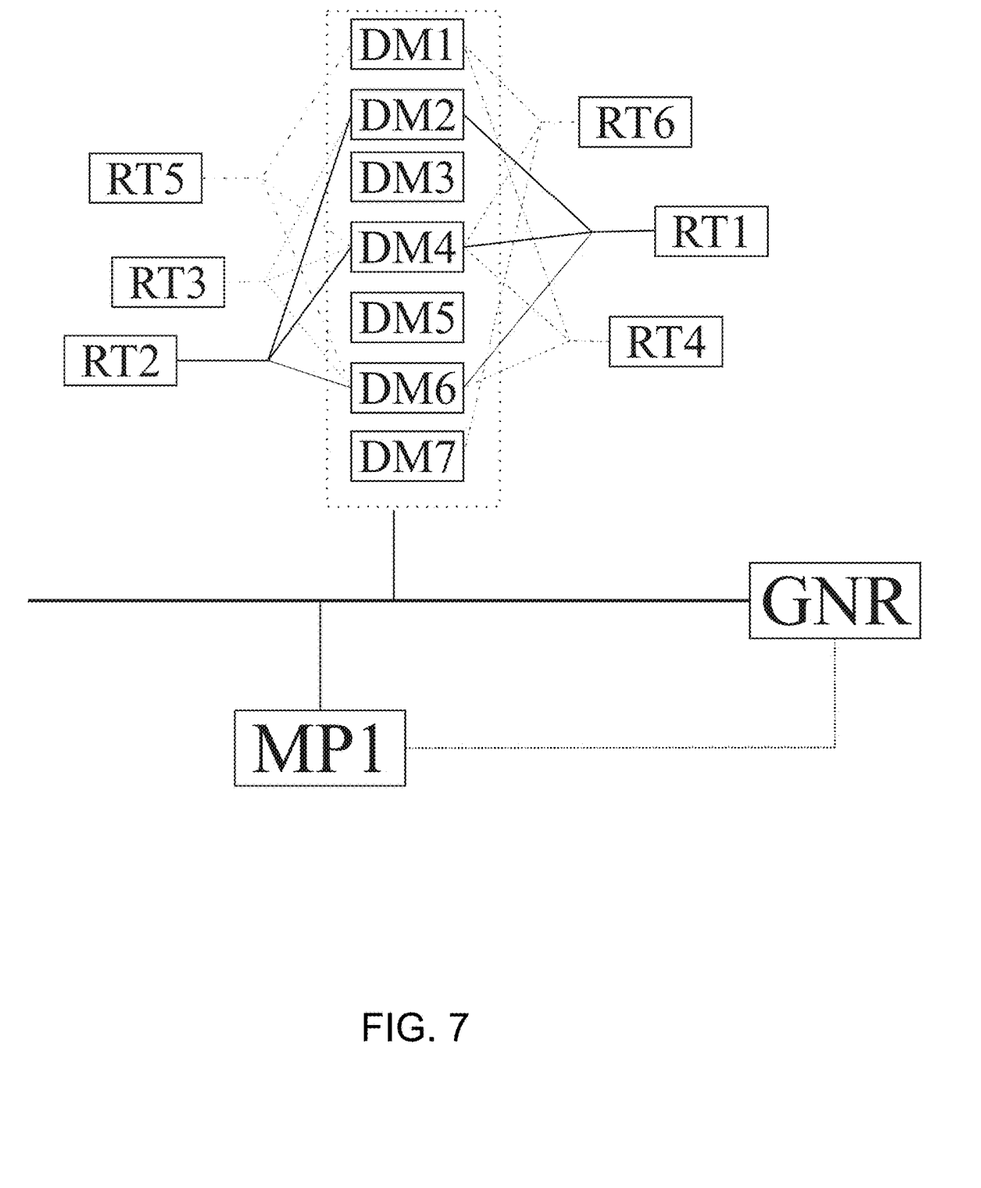
FIG. 7 illustrates a schematic of the resource repositioning load balancing and location management system.

FIG. 7 illustrates a schematic of the resource repositioning load balancing and location management system.

In accordance with an embodiment of this invention, there is provided a first mapping mechanism (MP1) in order to map topology of said grid network (GNR) of nodes, along with its resources.

Typically, for any arrangement of nodes, and resources thereof, there is a need for restructuring the topology of the grid in accordance with pre-defined rules. These pre-defined rules ensure that the restructured topology is in the format of rectangular or square grids. In at least one non-limiting exemplary embodiment, the arrangement of nodes, and resources thereof is in accordance with FIGS. 3 to 5 of the accompanying drawings. The rectangular or square grids may be aligned end to end such that edges may be shared. This may in 2-dimensional or in 3-dimensional format. The system and method of this invention will be applied to this restructured topology. In at least one embodiment, this restructuring is physical. In at least an alternative embodiment, this restructuring is logical or virtual.

An outgoing resource requested by node imbalances the grid network, which is to be balanced. Assuming that the existing grid network of resources is balanced, an outgoing resource may off balance the grid network of resources if other resources are not repositioned appropriately. The system and method of this invention ensures appropriate placement or replacement of resources.

In accordance with another embodiment of this invention, there is provided a determination mechanism (DTM) in order to determine the relative placement or relative position of the outgoing resource and in order to further determine the relative number of edges on which the outgoing resource resides. This determined relative placement or relative position is the instantaneous placement or position, meaning that this is the first or initial placement or position of the outgoing resource. The relative placement or relative position of the incoming resource is selected from the placement of position being a corner node or an intermittent node. This determined relative number of edges is the instantaneous number of edges that the incoming resource shared, meaning that these are the number of edges which are firstly or initially shared during the first or initial placement or position of the outgoing resource.

In accordance with another embodiment of this invention, there is provided a control layer mechanism adapted to control location of resource(s) to be restructured once a resource is removed. Firstly, an outgoing resource is removed, its position is determined, and resources are restructured depending upon pre-defined rules of the network hosting the nodes and resources. These resources need to be located or re-located upon specific nodes such that the entire network is balanced.

In accordance with another embodiment of this invention, there is provided a first decision making means (DM1) adapted to decide if the outgoing resource that is to be removed is an intermittent node or not.

In accordance with another embodiment of this invention, there is provided a second decision making means (DM2) adapted to decide if the outgoing resource that is to be removed is a corner node or not.

In accordance with another embodiment of this invention, there is provided a third decision making means (DM3) adapted to decide if the outgoing resource that is to be removed belongs to a single edge or not.

In accordance with another embodiment of this invention, there is provided a fourth decision making means (DM4) adapted to decide if the outgoing resource that is to be removed belongs to two or more edges or not.

In accordance with another embodiment of this invention, there is provided a fifth decision making mechanism to determine if the outgoing resource that is to be removed is placed on a node where number of overlaps is zero.

In accordance with another embodiment of this invention, there is provided sixth decision making mechanism to determine if the outgoing resource that is to be removed is placed on a node where number of overlaps is two.

In accordance with another embodiment of this invention, there is provided a seventh decision making mechanism to determine if the outgoing resource that is to be removed is placed on a node where number of overlaps is four.

In accordance with still another embodiment of this invention, there is provided a first resource replacement task invoking mechanism (RT1) configured to be activated if the output of the second decision making mechanism, the fourth decision making mechanism, as well as the output of the sixth decision making mechanism is concurrently true. This means that the outgoing resource that is to be removed from the grid network of resources belongs to a corner node, belongs to an overlapping edge, with 2 numbers of overlap.

The task associated with the first resource replacement task invoking mechanism is as follows:
selecting an edge which is adjacent to a second corner node of the edge from where said resource is removed;
selecting an intermittent node from said selected edge;
moving a resource from said selected intermittent node to its adjacent overlapped corner node which belongs to an edge from where said resource is removed;
moving resource from said second corner node of unselected edge, to any intermittent node of adjacent edge to it; and
moving resource from any intermittent node of overlapped edge to said first corner node from where said resource is removed.

This first task needs to be followed at least once.

This first resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a second resource replacement task invoking mechanism (RT2) configured to be activated if the output of the second decision making mechanism, the fourth decision making mechanism, as well as the output of the sixth decision making mechanism is concurrently true. This means that the outgoing resource that is to be removed from the grid network of resources belongs to a corner node, belongs to an overlapping edge, with 2 numbers of overlap.

The task associated with the second resource replacement task invoking mechanism is as follows:
selecting two edges adjacent to said first corner node from where said resource is removed;
from each edge, moving one resource from any adjacent intermittent node to a second corner node from where said resource is removed; and
moving resource from a second corner node of overlapped edge to any adjacent intermittent node which belongs to adjacent non-overlapped edge to that other node.

This second task needs to be followed at least once.

This second resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a third resource replacement task invoking mechanism (RT3) configured to be activated if the output of the second decision making mechanism, the fourth decision making mechanism, as well as the output of the sixth decision making mechanism is concurrently true. This means that the outgoing resource that is to be removed from the grid network of resources belongs to a corner node, belongs to an overlapping edge, with 2 numbers of overlap.

The task associated with the third resource replacement task invoking mechanism is as follows:
moving resource from an intermittent node of non-overlapped edge to node from where resource is removed; and
moving resource from an intermittent node of adjacent edge to a corner node which is a common corner node of current edge and the edge from said first corner node.

This third task needs to be followed at least once.

This third resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a fourth resource replacement task invoking mechanism (RT4) configured to be activated if the output of the first decision making mechanism, the fourth decision making mechanism, as well as the output of the sixth decision making mechanism is concurrently true. This means that the outgoing resource that is to be removed from the grid network of resources belongs to an intermittent node, belongs to an overlapping edge, with 2 numbers of overlap.

The task associated with the fourth resource replacement task invoking mechanism is as follows:
selecting any one corner node of edge from where said resource was removed;
moving resource from any one intermittent node from any edge adjacent to said selected corner node; and
moving resource from a second intermittent node of non-selected edge to an adjacent edge's intermittent node.

This fourth task needs to be followed at least once.

This fourth resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a fifth resource replacement task invoking mechanism (RT5) configured to be activated if the output of the first decision making mechanism, the fourth decision making mechanism, as well as the output of the sixth decision making mechanism is concurrently true. This means that the outgoing resource that is to be removed from the grid network of resources belongs to an intermittent node, belongs to an overlapping edge, with 2 numbers of overlap.

The task associated with the fifth resource replacement task invoking mechanism is as follows:
selecting any one corner node of edge from where said resource was removed;
moving resource from any one intermittent node, each of both edges adjacent to said selected corner node; and
moving resource from each of the other corner nodes of said selected edge to their respective adjacent nodes' intermittent nodes.

This fifth task needs to be followed at least once.

This fifth resource replacement task invoking mechanism may be configured to use buffer memories, serial buses, parallel buses, and/or shift registers, resource locators, resource handlers; which are all advantageously configured to perform the task associated with it, as disclosed above.

In accordance with still another embodiment of this invention, there is provided a sixth resource replacement task invoking mechanism (RT6) configured to be activated if the output of the first decision making mechanism, the fourth decision making mechanism, as well as the output of the sixth decision making mechanism is concurrently true. This means that the outgoing resource that is to be removed from the grid network of resources belongs to an intermittent node, belongs to an overlapping edge, with 2 numbers of overlap.

The task associated with the sixth resource replacement task invoking mechanism is as follows:

adding a resource from any intermittent node to another corner node of edge;

moving a resource from another corner node of non-selected edge to said adjacent intermittent node belonging to adjacent edge; and moving resource from said intermittent node of overlapped edge of which said added corner node and said another corner node belongs.

This sixth task needs to be followed at least once.

This sixth resource replacement task invoking mechanism may be configured to use buffer memories, serial buses, parallel buses, and/or shift registers, resource locators, resource handlers; which are all advantageously configured to perform the task associated with it, as disclosed above.

Figure 3:
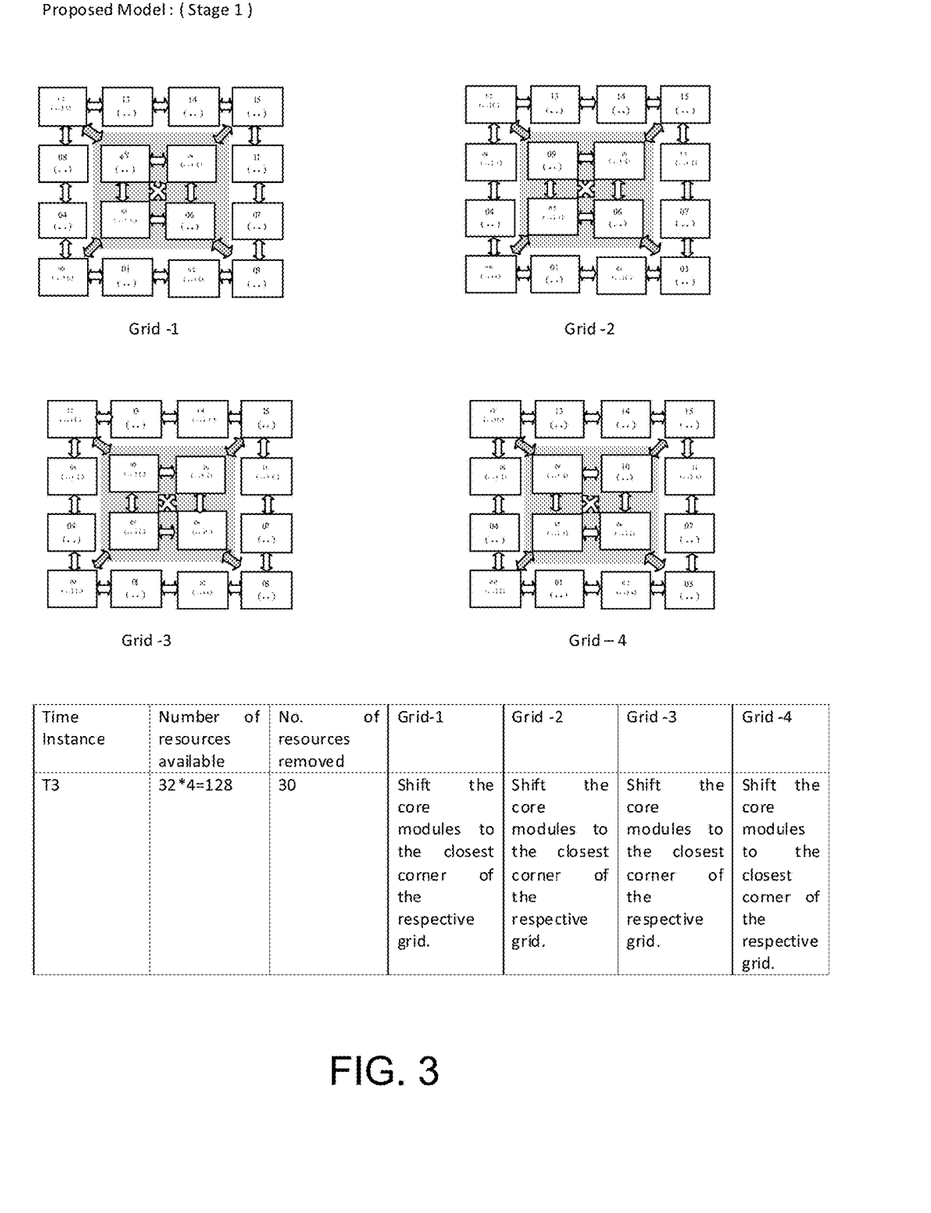
FIG. 3 illustrates a non-limiting exemplary embodiment of use of the system and method of this invention, wherein an initial step of restructuring takes place in order to be used by the system and method of this invention.

FIG. 3 illustrates a non-limiting exemplary embodiment of use of the system and method of this invention, wherein an initial step of restructuring takes place in order to be used by the system and method of this invention. Below is an associated Table 3.

TABLE 3

| Time Instance | Number of resources available | No. of resources removed | Grid-1 | Grid-2 | Grid-3 | Grid-4 |
|---|---|---|---|---|---|---|
| T3 | 32 * 4 = 128 | 30 | Shift the core modules to the closest corner of the respective grid. | Shift the core modules to the closest corner of the respective grid. | Shift the core modules to the closest corner of the respective grid. | Shift the core modules to the closest corner of the respective grid. |

Figure 4:
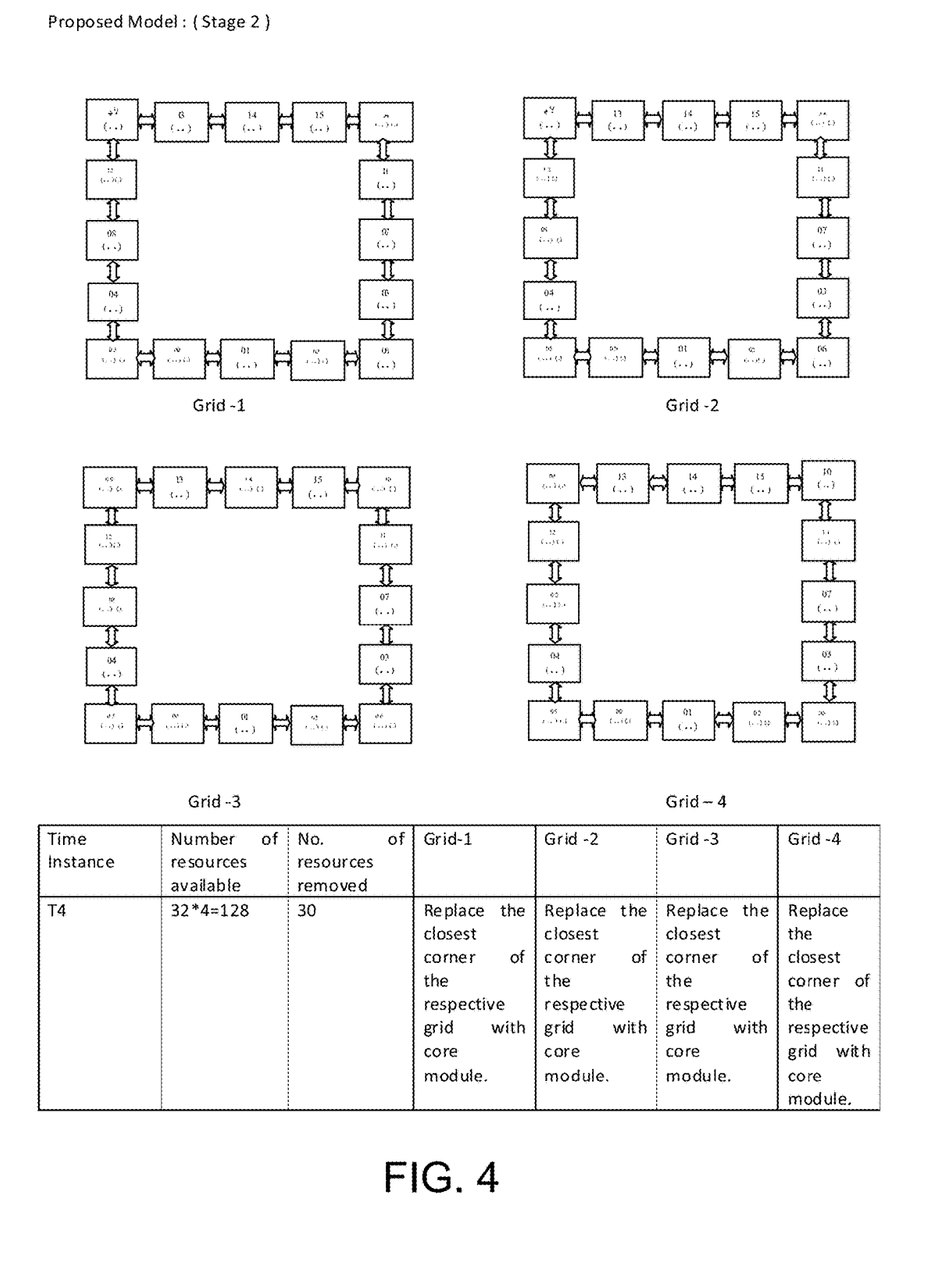
FIG. 4 illustrates a non-limiting exemplary embodiment of use of the system and method of this invention, which is obtained after initial restructuring of the grids of FIG. 3.

FIG. 4 illustrates a non-limiting exemplary embodiment of use of the system and method of this invention, which is obtained after initial restructuring of the grids of FIG. 3. Below is an associated Table 4.

TABLE 4

| Time Instance | Number of resources available | No. of resources removed | Grid-1 | Grid-2 | Grid-3 | Grid-4 |
|---|---|---|---|---|---|---|
| T4 | 32 * 4 = 128 | 30 | Replace the closest corner of the respective grid with core module. | Replace the closest corner of the respective grid with core module. | Replace the closest corner of the respective grid with core module. | Replace the closest corner of the respective grid with core module. |

Figure 5:
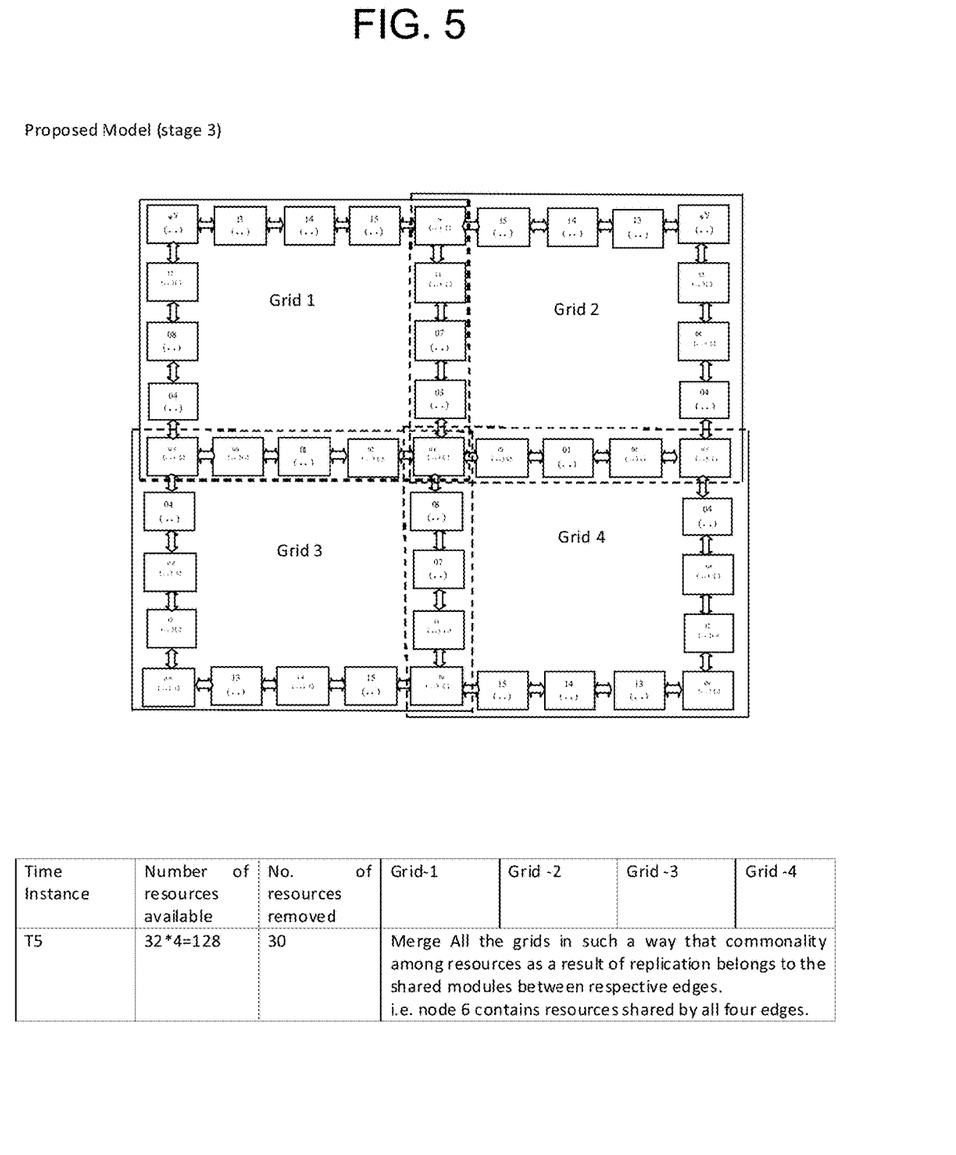
FIG. 5 illustrates a non-limiting exemplary embodiment of use of the system and method of this invention, which shows a virtual or physical re-modeled initial structure of grid network upon which the system and method of this invention is acted.

FIG. 5 illustrates a non-limiting exemplary embodiment of use of the system and method of this invention, which shows a virtual or physical re-modeled initial structure of grid network upon which the system and method of this invention is acted. Below is an associated Table 5.

TABLE 5

| Time Instance | Number of resources available | No. of resources removed | Grid-1 | Grid-2 | Grid-3 | Grid-4 |
|---|---|---|---|---|---|---|
| T5 | 32 * 4 = 128 | 30 | Merge All the grids in such a way that commonality among resources as a result of replication belongs to the shared modules between respective edges. i.e. node 6 contains resources shared by all four edges. | Merge All the grids in such a way that commonality among resources as a result of replication belongs to the shared modules between respective edges. i.e. node 6 contains resources shared by all four edges | Merge All the grids in such a way that commonality among resources as a result of replication belongs to the shared modules between respective edges. i.e. node 6 contains resources shared by all four edges | Merge All the grids in such a way that commonality among resources as a result of replication belongs to the shared modules between respective edges. i.e. node 6 contains resources shared by all four edges |

Figure 6:
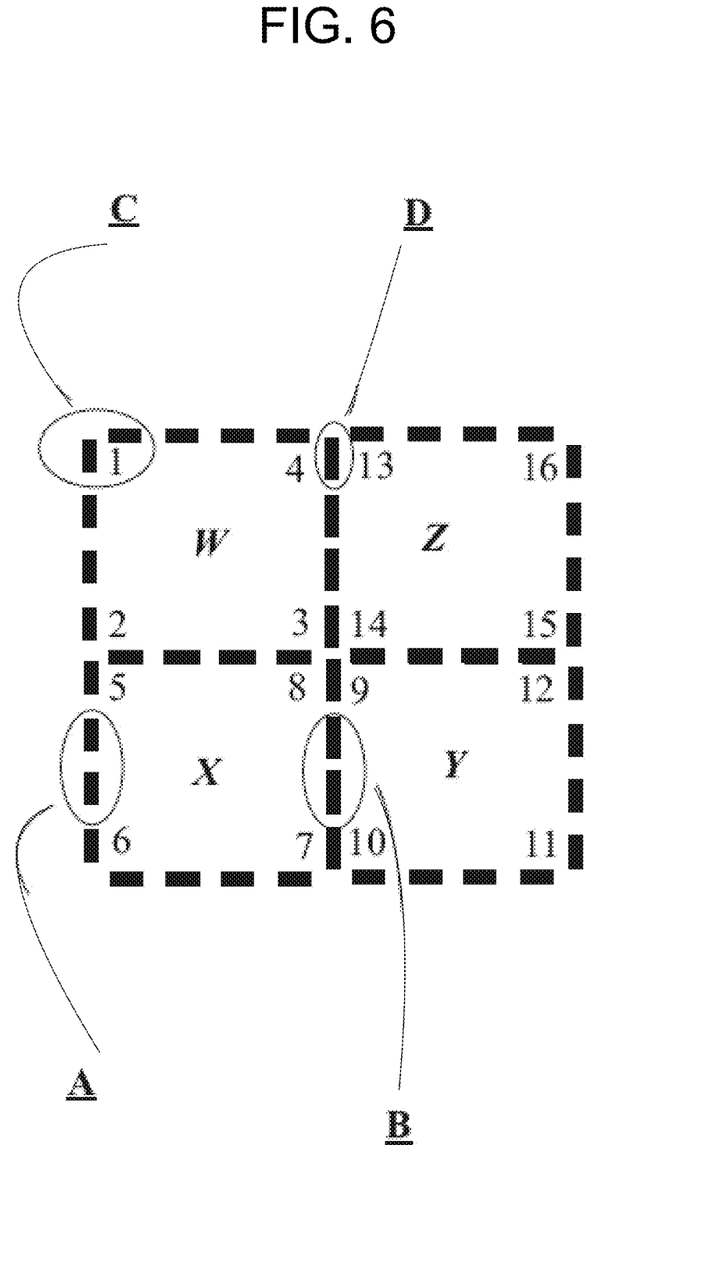
FIG. 6 is another representation of the grid network of FIG. 5.

FIG. 6 is another representation of the grid network of FIG. 5 where the reference numerals are as follows:

A—outgoing resource is initially located on intermittent node belong to one edge (before load balancing system and method of this invention);

B—outgoing resource is initially located on intermittent node belong to two edges (before load balancing system and method of this invention);

C—outgoing resource is initially located on corner node belong to one edge (before load balancing system and method of this invention); and D—outgoing resource is initially located on corner node belong to two edges (before load balancing system and method of this invention).

Furthermore, according to a non-limiting exemplary embodiment, this system and method steps are proved below. Once the grid layout is changed to unbalanced condition, the system and method is applied to check whether the given number of resources remain constant or not; in a balanced condition. The system and method considers the total number of resources available inside grid as load index. When the system and method adds resource, load index will be increased, and when the system and method deletes the resource, load index will decrease. Below is an associated Table 6.

TABLE 6

| Stage | Number of resources available | No. of resources removed | Grid-1 | Grid-2 | Grid-3 | Grid-4 |
|---|---|---|---|---|---|---|
| T1 | 32 * 4 = 128 | 0 | 32 | 32 | 32 | 32 |
| T2 | 32 * 4 = 128<br>128 − 30 = 98 | 30 | 32 − 5 = 27 | 32 − 7 = 25 | 32 − 10 = 22 | 32 − 8 = 24 |
| T3 | 32 * 4 = 128<br>128 − 30 = 98 | 30 | Shift the core modules to the closest corner of the respective grid. | Shift the core modules to the closest corner of the respective grid. | Shift the core modules to the closest corner of the respective grid. | Shift the core modules to the closest corner of the respective grid. |
| T4 | 32 * 4 = 128<br>128 − 30 = 98 | 30 | Replace the closest corner of the respective grid with core module. | Replace the closest corner of the respective grid with core module. | Replace the closest corner of the respective grid with core module. | Replace the closest corner of the respective grid with core module. |
| T5 | 32 * 4 = 128<br>128 − 30 = 98 | 30 | Merge All the grids in such a way that commonality among resources as a result of replication belongs to the shared modules between respective grids. i.e. node 6 contains resources shared by all four grids. Apply above algorithm steps based on which location resource removal taken place. Execution will keep the resource index constant irrespective of certain number of resource removals. | | | |
| T6 | 32 * 4 = 128 | 30 | 32 | 32 | 32 | 32 |

Once grid reaches step 5, the system and method of this invention will get executed in step 6 which will balance the grid in such a way that total number of resources available in the individual grid with modified structure (stage T5) will be 32. Though stage 2 results into modified count in the resources available in individual grid i.e. (Grid-1: 32−5=27, Grid-2: 32−7=25, Grid-2: 32−10=22, Grid-2: 32−8=24). Hence the system and method provides a technical advancement, in that, an innovative relocation scheme is provided in such a way that each grid shows a complete balanced view at the given instance, though resources gets added or get removed from grid.

The data, in each of the components, means, modules, mechanisms, units, devices of the system and method may be 'encrypted' and suitably 'decrypted' when required.

The systems described herein can be made accessible through a portal or an interface which is a part of, or may be connected to, an internal network or an external network, such as the Internet or any similar portal. The portals or interfaces are accessed by one or more of users through an electronic device, whereby the user may send and receive data to the portal or interface which gets stored in at least one memory device or at least one data storage device or at least one server, and utilises at least one processing unit. The portal or interface in combination with one or more of memory device, data storage device, processing unit and serves, form an embedded computing setup, and may be used by, or used in, one or more of a non-transitory, computer readable medium. In at least one embodiment, the embedded computing setup and optionally one or more of a non-transitory, computer readable medium, in relation with, and in combination with the said portal or interface forms one of the systems of the invention. Typical examples of a portal or interface may be selected from but is not limited to a website, an executable software program or a software application.

The systems and methods may simultaneously involve more than one user or more than one data storage device or more than one host server or any combination thereof.

A user may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a cave, pointing stick The systems and methods can be practiced using any electronic device which may be connected to one or more of other electronic device with wires or wirelessly which may use technologies such as but not limited to, Bluetooth, Wi-Fi, Wimax. This will also extend to use of the aforesaid technologies to provide an authentication key or access key or electronic device based unique key or any combination thereof.

In at least one embodiment, one or more user can be blocked or denied access to one or more of the aspects of the invention.

Encryption can be accomplished using any encryption technology, such as the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content can be performed in accordance with any technology including utilizing an encryption algorithm. The encryption algorithm utilized is not hardware dependent and may change depending on the digital content. For example, a different algorithm may be utilized for different websites or programs. The term 'encryption' further includes one or more aspects of authentication, entitlement, data integrity, access control, confidentiality, segmentation, information control, and combinations thereof.

The described embodiments may be implemented as a system, method, apparatus or article of manufacture using standard programming and/or engineering techniques related to software, firmware, hardware, or any combination thereof. The described operations may be implemented as code maintained in a "non-transitory, computer readable medium", where a processor may read and execute the code from the non-transitory, computer readable medium. A non-transitory, computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

The systems and methods can be practiced using any electronic device. An electronic device for the purpose of this invention is selected from any device capable of processing or representing data to a user and providing access to a network or any system similar to the internet, wherein the electronic device may be selected from but not limited to, personal computers, tablet computers, mobile phones, laptop computers, palmtops, portable media players, and personal digital assistants. In an embodiment, the computer readable medium data storage unit or data storage device is selected from a set of but not limited to USB flash drive (pen drive), memory card, optical data storage discs, hard disk drive, magnetic disk, magnetic tape data storage device, data server and molecular memory.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

Still further, the code implementing the described operations may be implemented in "transmission signals", where transmission signals may propagate through space or through a transmission media, such as an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory, computer readable medium at the receiving and transmitting stations or devices. An "article of manufacture" comprises non-transitory, computer readable medium or hardware logic, and/or transmission signals in which code may be implemented. A device in which the code implementing the described embodiments of operations is encoded may comprise a non-transitory, computer readable medium or hardware logic. Of course, those skilled in the art will recognize that many modifications may be made to this configuration without departing from the scope of the present invention, and that the article of manufacture may comprise suitable information bearing medium known in the art.

While this detailed description has disclosed certain specific embodiments for illustrative purposes, various modifications will be apparent to those skilled in the art which do not constitute departures from the spirit and scope of the invention as defined in the following claims, and it is to be distinctly understood that the foregoing descriptive matter is to be interpreted merely as illustrative of the invention and not as a limitation.

The invention claimed is:

1. A dynamic resource repositioning load balancing and location management method to reposition existing resources in a grid network of nodes in response to an outgoing resource from the grid network of nodes, the method comprising:
   mapping topology of the grid network of nodes, along with its resources;
   determining at least an initial placement of an outgoing resource in terms of a relative position of the node that the resource currently occupies and in terms of a number of relative edges on which the resource currently resides, the relative position being selected from a corner node or an intermittent node in the grid, the position also being selected from an overlap position or a non-overlap position; and
   repositioning the at least a resource, in the grid network of nodes, in response to an outgoing resource, the repositioning based on the determined position of the outgoing resource, wherein the repositioning includes at least one of,
      for any outgoing resource from an existing node, in the grid, determined as being from a corner node and from a non-overlapping node, moving one resource each from any two Intermittent nodes of non-overlapping adjacent edges belonging to an edge from where resource is removed, and
      for any outgoing resource from an existing node, in the grid, determined as being from an intermittent node and from a non-overlapping node, moving one resource from an intermittent node of a non-overlapping adjacent edge to another corner node of the edge from where the resource is removed.

2. The method of claim 1, wherein, the determining includes a first determining if the outgoing resource is removed from an intermittent node.

3. The method of claim 2, wherein, the determining includes a second determining if the outgoing resource is removed from a corner node.

4. The method of claim 3, wherein, the determining includes a third determining the outgoing resource as a non-overlapping resource if the outgoing resource belongs to one edge.

5. The method of claim 4, wherein, the determining includes a fourth determining that the outgoing resource is an overlapping resource if the outgoing resource belongs to two edges.

6. The method of claim 5, wherein, the determining includes a fifth determining if a number of overlaps is zero.

7. The method of claim 6, wherein, the determining includes a sixth determining if a number of overlaps is two.

8. The method of claim 7, wherein, the determining includes a seventh determining if a number of overlaps is four.

9. The method of claim 8, wherein, if the second determining, the fourth determining, and the sixth determining are simultaneously true, then the second determining determines a first corner node and the repositioning includes at least one of,
- selecting an edge which is adjacent to a second corner node of the edge from where the resource is removed,
- selecting an intermittent node from the selected edge,
- moving a resource from the selected intermittent node to its adjacent overlapped corner node which belongs to an edge from where the resource is removed,
- moving a resource from the second corner node of unselected edge, to any intermittent node of adjacent edge to it, and
- moving a resource from any intermittent node of overlapped edge to the first corner node from where the resource is removed.

10. The method of claim 8, wherein, if the second determining, the fourth determining, and the sixth determining are simultaneously true, then the second determining determines a first corner node and the repositioning includes at least one of,
- selecting two edges adjacent to the first corner node from where the resource is removed;
- from each edge, moving one resource from any adjacent intermittent node to a second corner node from where the resource is removed, and
- moving a resource from a second corner node of overlapped edge to any adjacent intermittent node which belongs to adjacent non-overlapped edge to that other node.

11. The method of claim 8, wherein, if the second determining, the fourth determining, and the sixth determining are simultaneously true, then the second determining determines a first corner node and the repositioning includes at least one of,
- moving a resource from an intermittent node of non-overlapped edge to a node from where resource is removed, and
- moving a resource from an intermittent node of an adjacent edge to a corner node which is a common corner node of current edge and the edge from the first corner node.

12. The method of claim 8, wherein, if the first determining, the fourth determining, and the sixth determining are simultaneously true, then the first determining determines a first intermittent node and the repositioning includes at least one of,
- selecting any one corner node of an edge from where the resource was removed,
- moving a resource from any one intermittent node from any edge adjacent to the selected corner node, and
- moving a resource from a second intermittent node of a non-selected edge to an adjacent edge's intermittent node.

13. The method of claim 8, wherein, if the first determining, the fourth determining, and the sixth determining are simultaneously true, then the first determining determines a first intermittent node and the repositioning includes at least one of,
- selecting any one corner node of an edge from where the resource was removed,
- moving a resource from any one intermittent node adjacent to the selected corner node, and
- moving resource from each of the other corner nodes of the selected edge to an intermittent node of a respective adjacent node.

14. The method of claim 1, wherein, if the first determining, the fourth determining, and the seventh determining are simultaneously true, then the first determining determines a first intermittent node and the repositioning includes at least one of,
- adding a resource from any intermittent node to another corner node of an edge,
- moving a resource from another corner node of a non-selected edge to the adjacent intermittent node belonging to an adjacent edge, and
- moving a resource from the intermittent node of an overlapped edge of which the added corner node and another corner node belongs.

15. A dynamic resource repositioning load balancing and location management system in order to reposition an outgoing resource in a grid network of nodes, said the system comprising:
- a computer processor configured to,
  - map topology of the grid network of nodes, along with its resources;
  - determine at least an initial placement of an outgoing resource in terms of a relative position of the node that the resource currently occupies and in terms of a number of relative edges on which the resource currently resides, the relative position being selected from a corner node or an intermittent node in the grid, the position also being selected from an overlap position or a non-overlap position; and
  - reposition another resource, in the grid network of nodes, in response to an outgoing resource, the repositioning based on the determined position of the outgoing resource, wherein the repositioning includes at least one of,
    - for any outgoing resource from an existing node, in the grid, determined as being from a corner node and from a non-overlapping node, moving one resource each from any two intermittent nodes of non-overlapping adjacent edges belonging to an edge from where resource is removed, and
    - for any outgoing resource from an existing node, in the grid, determined as being from an intermittent node and from a non-overlapping node, moving one resource from an intermittent node of a non-overlapping adjacent edge to another corner node of the edge from where the resource is removed.

16. The system of claim 15, wherein the determining includes,
- a first determining if the outgoing resource is removed from an intermittent node,
- a second determining if the outgoing resource is removed from a corner node,
- a third determining the outgoing resource as a non-overlapping resource if the outgoing resource belongs to one edge,
- a fourth determining that the outgoing resource s an overlapping resource if the outgoing resource belongs to two edges,
- a fifth determining if a number of overlaps is zero,
- a sixth determining if a number of overlaps is two,
- a seventh determining if a number of overlaps is four.

17. The system of claim 16, wherein, if the second determining, the fourth determining, and the sixth determining are simultaneously true, then the second determining determines a first corner node and the repositioning includes at least one of,     selecting an edge which is adjacent to a second corner node of the edge from where the resource is removed,     selecting an intermittent node from the selected edge,     moving a resource from the selected intermittent node to its adjacent overlapped corner node which belongs to an edge from where the resource is removed,     moving a resource from the second corner node of unselected edge, to any intermittent node of adjacent edge to it, and     moving a resource from any intermittent node of overlapped edge to the first corner node from where the resource is removed.

18. The system of claim 16, wherein, if the second determining, the fourth determining, and the sixth determining are simultaneously true, then the second determining determines a first corner node and the repositioning includes at least one of,     selecting two edges adjacent to the first corner node from where the resource is removed;

from each edge, moving one resource from any adjacent intermittent node to a second corner node from where the resource is removed, and     moving a resource from a second corner node of overlapped edge to any adjacent intermittent node which belongs to adjacent non-overlapped edge to that other node.

19. The system of claim 16, wherein, if the second determining, the fourth determining, and the sixth determining are simultaneously true, then the second determining determines a first corner node and the repositioning includes at least one of,     moving a resource from an intermittent node of non-overlapped edge to a node from where resource is removed, and     moving a resource from an intermittent node of an adjacent edge to a corner node which is a common corner node of current edge and the edge from the first corner node.

20. The system of claim 16, wherein, if the first determining, the fourth determining, and the sixth determining are simultaneously true, then the first determining determines a first intermittent node and the repositioning includes at least one of,     selecting any one corner node of an edge from where the resource was removed,     moving a resource from any one Intermittent node from any edge adjacent to the selected corner node, and     moving a resource from a second intermittent node of a non-selected edge to an adjacent edge's intermittent node.

\* \* \* \* \*